(12) United States Patent
Song et al.

(10) Patent No.: US 10,646,009 B2
(45) Date of Patent: May 12, 2020

(54) RING HAVING IMPROVED WEIGHT, DURABILITY, DAMAGE RESISTANCE, SHINE AND WORKABILITY FEATURES

(71) Applicants: Jeong-su Song, Seoul (KR); Nun-Choi Jun, Seoul (KR)

(72) Inventors: Jeong-su Song, Seoul (KR); Nun-Choi Jun, Seoul (KR)

(73) Assignee: Quantum Jewelry (Hong Kong) Limited, Hong Kong (HK)

(*) Notice: Subject to any disclaimer, the term of this patent is extended or adjusted under 35 U.S.C. 154(b) by 8 days.

(21) Appl. No.: 15/834,398

(22) Filed: Dec. 7, 2017

(65) Prior Publication Data

US 2019/0174886 A1    Jun. 13, 2019

(51) Int. Cl.
| | | |
|---|---|---|
| *A44C 9/00* | (2006.01) | |
| *C22C 29/08* | (2006.01) | |
| *C22C 29/02* | (2006.01) | |
| C22C 29/00 | (2006.01) | |
| C22C 29/06 | (2006.01) | |
| B22F 5/00 | (2006.01) | |
| B22F 7/06 | (2006.01) | |
| B22F 5/10 | (2006.01) | |

(52) U.S. Cl.
CPC ............ *A44C 9/0015* (2013.01); *C22C 29/02* (2013.01); *C22C 29/08* (2013.01); *B22F 5/106* (2013.01); *B22F 7/062* (2013.01); *B22F 2005/005* (2013.01); *C22C 29/005* (2013.01); *C22C 29/067* (2013.01)

(58) Field of Classification Search
CPC ........... A44C 5/003; A44C 25/00; A44C 9/00; A44C 9/0007; A44C 9/0015

USPC .......................................... 63/15, 15.1, 15.7
See application file for complete search history.

(56) References Cited

U.S. PATENT DOCUMENTS

| | | | | |
|---|---|---|---|---|
| 2,514,844 A | * | 7/1950 | Cohen ..................... | A61J 17/02 446/267 |
| 3,214,939 A | * | 11/1965 | Monahan ............. | A44C 9/0084 446/901 |
| 3,933,010 A | * | 1/1976 | Ulbrich ................... | A44C 9/02 63/15.6 |
| 6,062,045 A | * | 5/2000 | West ........................ | A44C 9/00 63/15 |

(Continued)

*Primary Examiner* — Emily M Morgan
(74) *Attorney, Agent, or Firm* — Newman Law, LLC

(57) ABSTRACT

A ring and method of manufacturing a ring which may include: an outer ring, in which a second carbide composed of a combination of tungsten carbide, iron group carbide or carbonitride is mixed with a metal binder phase at a predetermined ratio, in which the outer ring is divided into a first outer ring and a second outer ring formed in a shape corresponding to each other; an inner ring separately and/or independently assembled between the first and second outer rings, in which the inner ring includes an outside inner ring that forms an outer circumferential surface of the ring and an inside inner ring that forms an inner circumferential surface of the ring; ring fitting parts formed on the first and second outer rings, respectively, such that both sides of the outer and inside inner rings are press-fit; and assembling protrusions formed on the first and second outer rings, respectively, to be inserted into the outer circumferential surface of the inside inner ring to maintain a firm assembly between the outer ring and the inner ring for a long period of time.

5 Claims, 2 Drawing Sheets

(56) References Cited

U.S. PATENT DOCUMENTS

| | | | | |
|---|---|---|---|---|
| 6,928,734 B1* | 8/2005 | West | ............... | A44C 9/00 |
| | | | | 29/896.412 |
| 7,823,415 B2* | 11/2010 | Gruosi-Scheufele | ............... | |
| | | | | A44C 17/0291 |
| | | | | 63/15 |
| 2005/0199007 A1* | 9/2005 | LaCroix | ............... | A44C 9/00 |
| | | | | 63/28 |
| 2013/0091895 A1* | 4/2013 | Hwang | ............... | A44C 9/02 |
| | | | | 63/15.1 |
| 2018/0289117 A1* | 10/2018 | Guirguis | ............... | A44C 9/00 |

* cited by examiner

RING HAVING IMPROVED WEIGHT, DURABILITY, DAMAGE RESISTANCE, SHINE AND WORKABILITY FEATURES

BACKGROUND OF THE INVENTION

Field of the Invention

The present disclosure relates to a ring. More particularly, the present disclosure relates to a ring fabricated into a structure in which a plurality of outer rings made of tungsten are prepared, and an inner ring made of materials such as surgical stainless steel, gold, surgical titanium or the like, are separately and/or independently coupled between the outer rings, thereby achieving beneficial qualities and characteristics, such as maximized weight or lightness, durability, damage or impact resistance, glossiness, workability, high corrosion resistance, density or dense structure and a high quality feel and appearance, among other things.

Rings used as jewelry are generally made of a precious metal such as gold and silver, and in addition to the precious metal, various jewels may be added to express a unique shape or image. The shape and the design of jewelry may vary greatly, as they have been widely used as decorative ornaments for illustrating individual personality.

Rings contain a relatively soft material such as gold and/or silver with expensive jewels inlaid on a portion of the outer circumferential surface. However, a general conventional ring is made of a soft material such that surface is prone to scratching, and the expensive price thereof restricts such rings from being widely used as an ornament.

In view of such circumstances, U.S. Pat. No. 6,062,045 discloses a method of fabricating a circular ring having a specific shape, using a heated alloy or ceramic material with powder metallurgy, including 80 wt % tungsten material based on the total weight.

In addition, U.S. Pat. No. 6,928,734 discloses a method of fabricating a ring using tungsten as a main material, in which an annular concave portion is formed on the outer circumferential surface of the ring during powder metallurgy compression molding, followed by inlaid of the concave groove with a precious metal. Specifically, the powder metallurgical compression molding is performed using powder of a material containing 50 wt % to 85 wt % tungsten carbide, and sintered and polished into a ring shape.

Both of the above patents teach using tungsten as a main material in fabricating the ring with the tungsten content being used up to 85 wt % at the maximum, resulting in a ring surface being prone to scratching and damage, thus resulting in a reduced value of the ring. Further, the high tungsten has a disadvantage in that it can be broken by external impact or cracked on the surface due to the brittleness of the material.

SUMMARY OF THE INVENTION

The present disclosure is designed to solve the problems of the related art, among other things, and therefore the present disclosure is directed in some embodiments to a ring, and method of providing a ring, having a structure in which a plurality of outer rings made of tungsten are prepared, and inner rings made of materials such as surgical stainless steel, gold, surgical titanium, or combinations thereof, are separately and/or independently coupled adjacent to one another between the outer rings, thereby providing a ring composed of an alloy for use in jewelry with superior properties for the ring such as desirable durability, corrosion resistance, high strength, toughness, lightness and excellent physicochemical properties.

Further, the present disclosure is directed to providing a ring with maximized lightness, durability, impact resistance, glossiness, workability and the like compared to cemented carbide used for jewelry, thereby realizing a variety of beautiful surface colors, and thus can provide a ring distinguished from existent alloy and of excellent merchantability.

Further, the present disclosure is directed to providing a ring having a structure in which a plurality of outer rings and inner rings are separately and/or independently assembled with each other such that, at the time of maintenance and repair, the respective rings can be separated and only the component in need of repair is replaced or repaired, thus greatly reducing the maintenance cost.

In some embodiments of the present disclosure, there is provided a ring which may include: an outer ring, in which a second carbide composed of a combination of tungsten carbide, iron group carbide or carbonitride is mixed with a metal binder phase at a predetermined ratio, in which the outer ring is divided into a first outer ring and a second outer ring formed in a shape corresponding to each other; an inner ring separately and/or independently assembled between the first and second outer rings, in which the inner ring includes an outside inner ring that forms an outer circumferential surface of the ring and an inside inner ring that forms an inner circumferential surface of the ring; ring fitting parts formed on the first and second outer rings, respectively, such that both sides of the outer and inside inner rings are press-fit; and assembling protrusions formed on the first and second outer rings, respectively, to be inserted into the outer circumferential surface of the inside inner ring to maintain a firm assembly between the outer ring and the inner ring for a long period of time.

According to some embodiments of the present disclosure, the ring fitting parts include an upper fitting part to which the outside inner ring is coupled and a lower fitting part to which the inside inner ring is coupled.

Further, according to some embodiments of the present disclosure, the ring may further include a chamfered portion formed on the outer circumferential surface at an angle of 30 to 50°, and a plurality of decorative grooves configured at a predetermined spacing along a circumferential surface, thus improving an exterior appearance of the ring and also facilitating separation of the outer ring and the inner ring.

Further, according to some embodiments of the present disclosure, the assembling protrusions may include support parts formed on upper ends to support an inner circumferential surface of the outside inner ring, and assembling parts formed on lower ends to be inserted into an outer circumferential surface of the inside inner ring.

Further, according to some embodiments of the present disclosure, the ring may include first and second assembling grooves formed in the inside inner ring in a shape corresponding to the assembling parts to receive the assembling protrusions inserted therein.

Further, according to some embodiments of the present disclosure, the outer ring may be formed with a composition ratio of, based on a total weight thereof, 10 wt % to 49 wt % of tungsten carbide, 35 wt % to 60 wt % of a second carbide composed of carbides or carbonitrides of 4a, 5a and 6a iron group elements of the periodic table, and 10 wt % to 30 wt % of nickel or stainless alloy metal binder phase.

Further, according to some embodiments of the present disclosure, the outside inner ring may be composed of either of surgical titanium or gold, or a mixture of both the surgical titanium and gold at a predetermined amount.

Further, according to some embodiments of the present disclosure, the inside inner ring may be composed of either of surgical stainless steel or gold, or a mixture of both the surgical stainless steel and gold at a predetermined amount.

These and other objects and advantages of the present disclosure may be understood from the following detailed description and will become more fully apparent from the exemplary embodiments of the present disclosure. Also, it will be easily understood that the objects and advantages of the present disclosure may be realized by the subject matter disclosed herein and in the appended claims and equivalents thereof.

DESCRIPTION OF DRAWINGS

Other objects and aspects according to the present disclosure will become apparent from the following descriptions of the invention and its embodiments with reference to the accompanying drawings in which.

DETAILED DESCRIPTION OF EMBODIMENTS OF THE INVENTION

Hereinafter, exemplary and preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
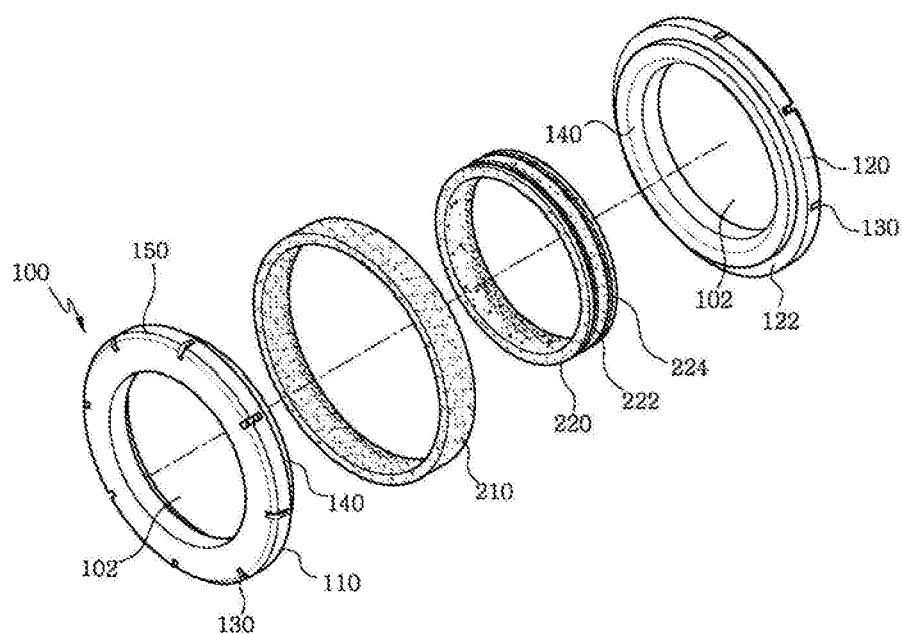
FIG. 1 is an exploded perspective view showing a ring according to an embodiment of the present disclosure.
Figure 2:
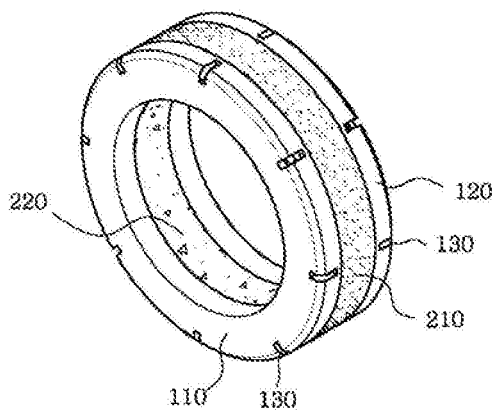
FIG. 2 is a perspective view of a ring according to an embodiment of the present disclosure.
Figure 3:
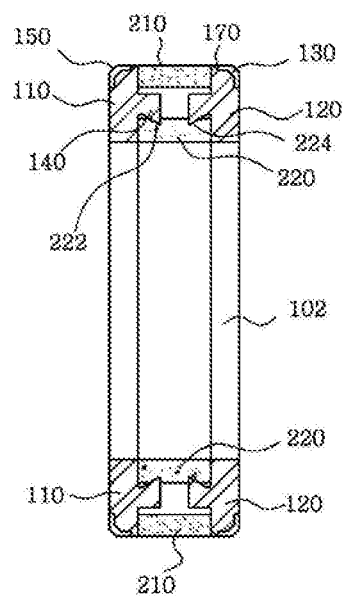
FIG. 3 is a cross-sectional view illustrating a ring in coupled state, according to an embodiment of the present disclosure.
Figure 4:
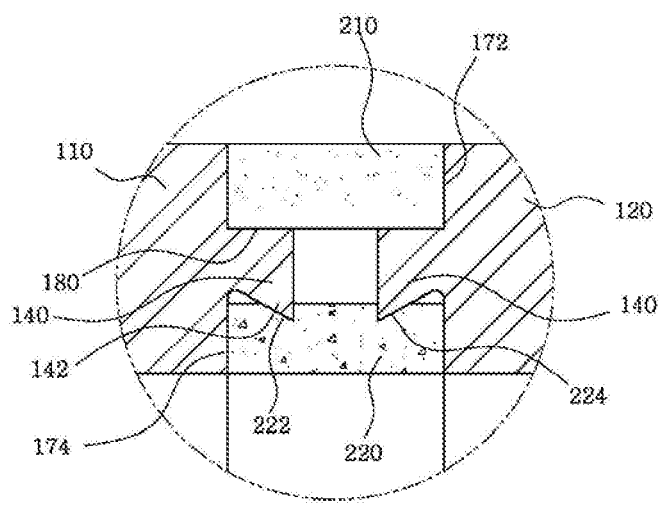
FIG. 4 is an enlarged view showing a main portion of a ring according to an embodiment of the present disclosure.

As shown in the FIGS. 1-4, the ring according to the present disclosure includes an outer ring 100 containing a predetermined amount of tungsten material, and an inner ring 200 made of one of surgical stainless steel, surgical titanium, or gold, or of a mixture of two or more materials of surgical stainless steel, surgical titanium, or gold mixed at a predetermined amount, in which the outer ring 100 an the inner ring 200 are configured such that they 100, 200 are separable from each other and assemblable with each other.

The outer ring 100 forms one side and the other side of the ring and is divided into a first outer ring 110 and a second outer ring 120 in which the first and second outer rings 110 and 120 are formed in a shape corresponding to each other and having an insertion hole 102 into which a finger is inserted. A boundary line between the insertion hole 102 and the outer ring 100, i.e., a circumferential surface of the insertion hole 102 may be crafted into a round shape so as not to harm it when the finger is inserted.

Further, between the first and second outer rings 110 and 120, which are the divided inner ring 100, an outside inner ring 210 forming the outer circumferential surface of the ring and an inside inner ring 220 forming an inner circumferential surface of the ring are formed.

Meanwhile, the outer ring 100 according to the present disclosure is provided with ring fitting parts configured on the first and second outer rings 110, 120 for secure coupling between the outside inner ring 210 and the inside inner ring 220, and the ring fitting parts include an upper fitting part 172 to which the outside inner ring 210 is coupled, and a lower fitting part 174 to which the inside inner ring 220 is coupled.

Further, the ring fitting parts are provided as a certain groove that can prevent a generation of a gap between the first and second outer rings 110, 120 and the outside inner ring 210 and can simultaneously provide tight fixing force, by allowing both leading ends of the outside inner ring 210 to be fixed to the outer circumferential surfaces of the first and second outer rings 110, 120 in a close contact.

Further, the outer ring 100 is provided with a chamfered portion 150 having an angle of 30 to 50° on the outer circumferential surface so that the design of the ring is further enhanced and the possibility that the wearer's finger is injured by the edge of the ring or the like can be prevented.

Further, the outer ring 100 is provided with a plurality of decorative grooves 130 spaced apart along the circumferential surface, thus enhancing the exterior appearance of the ring, and is inserted with a decoupling tool to facilitate separation of the outer ring 100 and the inner ring 200.

In addition, according to the present disclosure, assembling protrusions 140 are configured to maintain the outer ring 100 and the inside inner ring 220 in the assembled state for a long period of time when the outer ring 100 is assembled with the inside inner ring 220, so that the outer ring 100 and the inner ring 200 can have an integrity therebetween.

The assembling protrusions 140 protrude from the inner surfaces of the first and second outer rings 110, 120, and may be formed in an annular shape along the inner circumferential surface of the outer ring 100, or a plurality of assembly protrusions 140 may be formed at a predetermined spacing from one another.

The assembling protrusion 140 has a supporting part 180 on an upper end that is in close contact with the inner circumferential surface of the outside inner ring 210 of the inner ring 200 to support the outside inner ring 210, an assembling part 142 formed on a lower end to be inserted into the outer circumferential surface of the inside inner ring 220 to thus allow the outer ring 100 and the inside inner ring 220 to be assembled with each other.

The inner ring 200 is composed of the outside inner ring 210 and the inside inner ring 220, and may be made of a material different from that of the outer ring 100 and is separately and/or independently assembled.

The outside inner ring 210 of the inner rings 200 is preferably made of a surgical titanium, but may be composed of a mixture of surgical titanium and gold at a predetermined weight ratio.

The outside inner ring 210 described above is formed such that its outer circumferential surface is on the same line as the outer circumferential surface of the outer ring 100 and the inner circumferential surface is in close contact with the supporting part 180 formed on the assembling protrusion 140 of the outer ring 100, and the front and rear portions thereof are fitted into the upper fitting parts 172 formed between the first and second outer rings 110 and 120, thus allowing assembling with the outer ring 100.

Further, the inside inner ring 220 of the inner ring 200 is coupled with the outer ring 100 as it 220 is press-fit into the lower fitting part 174 formed between the first and second outer rings 110 and 120, and includes first and second assembling grooves 222, 224 formed in a shape corresponding to the assembling protrusion 142 to receive the assembling parts 142 of the assembling protrusions 140 formed on the first and second outer rings 110 and 120 inserted therein, to thus maintain a more secure fixing force with the outer ring 100.

In the ring configured according to the present disclosure described above, the outer ring 100 may be formed by mixing, at a certain weight ratio, a second carbide composed of a combination of tungsten carbide (WC), iron carbide or carbonitride, with a metal binder phase, and performing injection molding, although embodiments are not limited thereto.

In the above example, when fabricated, the tungsten carbide according to the present disclosure has a composition that does not exceed 50 wt % of the total weight of the outer ring 100, and 35 to 75 wt % of each carbide or carbonitride except tungsten carbide is mixed with tungsten carbide.

Preferably, according to the present disclosure, the outer ring 100 may be made from powder raw materials composed of, based on a total weight thereof, 10 wt % to 49 wt % of tungsten carbide, 35 wt % to 60 wt % of a second carbide composed of carbides or carbonitrides of 4a, 5a and 6a iron group elements of the periodic table, and 10 wt % to 30 wt % of nickel or stainless alloy metal binder phase.

On the other hand, tungsten carbide (WC) has a high melting point of 2870° C. and is excellent in heat resistance. Further, tungsten carbide (WC) also has a high wear resistance, compressive strength and hardness, measuring Mohs' hardness from about 9 to 9.5, Vickers hardness from about 1700 to about 2400, and Rockwell hardness of about 90. The Young's modulus is 550 Gpa, the bulk modulus is 439 Gpa, and the shear modulus is 270 Gpa.

In addition, the tungsten carbide used in the outer ring 100 according to the present disclosure preferably has a particle size of 2 to 8 microns, because if the particle size of tungsten carbide is 2 microns or less, the specific surface area of the powder increases, thus deteriorating the workability in the milling and molding process, while if it is 8 microns or more, the physical properties such as strength, toughness, durability, and so on are deteriorated.

Further, the content of the tungsten carbide in the alloy according to the present disclosure is preferably 50 wt % or less, because, as compared with 70 to 90 wt % of the conventional cemented carbide for a jewel, it will greatly enhance lightness, durability, impact resistance, glossiness, workability and the like, thus providing superior properties that can be obtained from an alloy for jewelry.

In addition, in the fabricating process of the outer ring 100, aluminum oxide may be further added in an amount of 1 to 5 wt %, meaning that the aluminum oxide added during a fabricating process of sintered body will remain independently without chemically reacting with the outer ring 100, thus greatly enhancing the merchantability of jewelry.

Further, the second carbide (XC) to be mixed with tungsten carbide is preferably molybdenum carbide ($Mo_2C$), titanium carbide (TiC), chromium carbide ($Cr_3C_2$), tantalum carbide (TaC), WTiC and WMoC and carbonitride (XCN) are WTiCN and TiCN. Further, it is preferable that each carbide or carbonitride is composed of at least one selected from each group.

Further, the metal binder phase included in the outer ring 100 according to the present disclosure is composed of cobalt, nickel, or a stainless alloy alone or in combination.

Meanwhile, the outside inner ring 210 of the inner ring 200 according to the present disclosure may be formed of any one of surgical titanium or gold, or both of them may be mixed at a certain amount.

Meanwhile, the outside inner ring 220 of the inner ring 200 according to the present disclosure may be formed of any one of surgical stainless steel or gold, or both of them may be mixed at a certain amount.

The surgical stainless steel is a metal used as a medical material for its harmlessness to human body. In addition, it is a material that is much lighter than other metals and that allows craftmanship, has no discoloration, and is not allergic. It has superior workability compared to the conventional alloy for jewelry and can realize various designs. It also has excellent glossiness and surface roughness provided by the surface polishing, and has excellent merchantability.

EXAMPLES

As an example of fabricating a ring according to the present disclosure, five kinds of cemet alloys were prepared with respective components and compositions in a range of: 10 to 49 wt % of tungsten carbide, 35 to 75 wt % of the second carbide or carbonitride, 10 to 30 wt % of cobalt, nickel or stainless alloy, and 3 wt % of aluminum oxide. On the other hand, three kinds of alloys of typical composition of conventional cemented carbide were prepared at the same time, and various characteristics were compared.

TABLE 1

Comparison of composition between the alloy component according to the present disclosure and conventional cemented carbide

| | | Alloy composition (wt %) | | | | |
|---|---|---|---|---|---|---|
| | No. | WC | (Mo, Ti, Cr, Ta) | C or CN | Co, Ni, SUS | $Al_2O_3$ |
| Alloy of Present Disclosure | 1 | 10 | 75 | C | 15 Co—Ni | — |
| | 2 | 28 | 56 | C | 16 Co | — |
| | 3 | 38 | 43 | CN | 19 Ni | — |
| | 4 | 49 | 36 | C | 15 SUS | — |
| | 5 | 32 | 35 | C | 30 Co—Ni | 3 |
| Conventional cemented carbide | 6 | 92 | — | | 8 Ni | — |
| | 7 | 92 | — | | 8 Co | — |
| | 8 | 90 | — | | 10 Co | — |

Each of the eight kinds of alloys shown in the above Table 1 was fabricated by powder metallurgy. The alloy powders of each composition were wet milled for 45 hours by ball milling, and then the slurry powder was dried and pressed at a molding pressure of 180 MPa to produce compacts and sintered at 1300 to 1450 degrees vacuum atmosphere to produce dense alloys without pores. Meanwhile, the alloys 1 to 5 according to the present disclosure had excellent sintering property and was densely sintered at a temperature of 1400° C. or less.

The sintered body samples prepared as described above were polished using a diamond wheel to prepare samples of square type 6.5×5×20 mm and cylindrical type 10×8 mm, and their physical properties and chemical stability were measured and examined. The specific gravity and the Vickers hardness were measured in order to measure respective property values, and the strength of the alloy was measured with 3-point bending stiffness. To evaluate the impact resistance, the fracture toughness value was measured using the Indentationq method. The corrosion resistance was compared with the conventional cemented carbide using 3% hydrochloric acid and nitric acid solution. The oxidation resistance was compared by heating to 500 degrees at atmosphere and comparing degrees of surface oxidation.

TABLE 2

Comparison of physical properties between the alloy according to the present disclosure and conventional cemented carbide

| | No | Specific Gravity D (g/Cm$^3$) | Hardness Hv (GPa) | Bending stiffness s (kg/mm$^2$) | Fracture toughness Kic (MPam$^{1/2}$) | Corrosion resistance, Oxidation resistance |
|---|---|---|---|---|---|---|
| Alloy of Present Disclosure | 1 | 8.37 | 14.5 | 243 | 12.2 | Excellent |
| | 2 | 9.10 | 14.3 | 305 | 13.1 | Excellent |
| | 3 | 9.97 | 14.1 | 323 | 13.8 | Excellent |
| | 4 | 10.67 | 14.0 | 296 | 13.1 | Excellent |
| | 5 | 10.45 | 12.8 | 387 | 14.5 | Excellent |
| Conventional Cemented Carbide Alloy | 6 | 14.66 | 14.2 | 260 | 12.7 | Excellent |
| | 7 | 14.65 | 14.4 | 293 | 12.5 | Excellent |
| | 8 | 14.45 | 14.1 | 318 | 13.0 | Excellent |

As shown in Table 2, alloys 1 to 5 according to the present disclosure showed a specific gravity lower than that of conventional cemented carbides 6 to 8 by about 30% or more, thus confirming the effect of reduced weight. Moreover, even when the tungsten carbide content was reduced to less than 50% by specific gravity, the hardness and strength values were higher than those of conventional cemented carbides, and the fracture toughness value, which means impact resistance, was particularly superior to that of conventional alloys, thus confirming that the alloys according to the present disclosure have excellent properties for an alloy of jewelry. In addition, corrosion resistance and oxidation resistance were superior to those of the conventional alloys. Meanwhile, the alloys 1 to 5 according to the present disclosure had excellent glossiness and surface roughness by the surface polishing process, and therefore, based on such properties, the alloys are considered as having high commerciality as an alloy for jewelry.

The present disclosure gives the following effects. According to the present disclosure, the merchantability of the ring can be enhanced, since the lightness, durability, impact resistance, glossiness, workability, and the like are maximized as compared with cemented carbide used for jewelry.

Further, according to the present disclosure, it is possible to provide a ring intact from damage from impact for its high hardness and high intrinsic resistance, also intact from corrosion for its high corrosion resistance, and having dense structure and superior quality, thus providing an effect of increased customer satisfaction.

Further, according to the present disclosure, it is possible to provide a ring of an alloy material for jewelry which can realize a diversity of beautiful surface colors and thus have distinguishing properties from conventional alloys, and to provide a ring with excellent merchantability.

Further, according to the present disclosure, a ring is configured into a structure in which a plurality of outer rings and inner rings are separately and/or independently assembled with each other such that, at the time of maintenance and repair, the respective rings can be separated and only the component in need of repair is replaced or repaired, thus greatly reducing the maintenance cost.

The present disclosure has been described in detail. However, it should be understood that the detailed description and specific examples, while describing exemplary and preferred embodiments of the disclosure, are provided for illustration, since various changes and modifications within the scope of the disclosure will become apparent to those skilled in the art from this detailed description. Accordingly, the embodiments disclosed in the present disclosure are provided to explain, not to limit a technical art of the present disclosure, and thus, the scope of the present disclosure is not limited by the information contained herein. The scope of the present disclosure should be construed by following claims in light of the present disclosure along with equivalents thereof.

What is claimed is:

1. A ring comprising:
    an outer ring, wherein the outer ring comprises tungsten carbide and a second carbide composed of a iron group carbide or carbonitride mixed with a metal binder phase at a predetermined ratio, wherein the outer ring is divided into a first outer ring and a second outer ring formed in a shape corresponding to each other;
    an inner ring between the first and second outer rings, wherein the inner ring comprises an outside inner ring that forms an outer circumferential surface of the ring and an inside inner ring that forms an inner circumferential surface of the ring, the inside inner ring defining an outside circumferential surface, wherein the inside inner ring includes an assembling groove on the outer circumferential surface;
    ring fitting parts formed on the first and second outer rings, respectively, the ring fitting parts comprising an upper fitting part to which the outside inner ring is coupled and a lower fitting part to which the inside inner ring is coupled; and
    assembling protrusions formed on the first and second outer rings, respectively, the assembling protrusions being inserted into the assembling groove on the outer circumferential surface of the inside inner ring, and wherein the outside inner ring is composed of either of surgical titanium or gold, or a mixture of both the surgical titanium and gold at a predetermined amount.

2. The ring according to claim 1, further comprising a chamfered portion formed on an outer circumferential surface of the outer ring, the chamfered portion having an angle of 30 to 50°, and a plurality of decorative grooves configured at a predetermined spacing along a circumferential surface.

3. The ring according to claim 1 wherein the assembling groove comprises first and second assembling grooves formed on the outer circumferential surface of the inside inner ring in a shape corresponding to the assembling protrusions to receive the assembling protrusions inserted therein.

4. The ring according to claim 1, wherein the outer ring is formed with a composition ratio of, based on a total weight thereof, 10 wt % to 49 wt % of tungsten carbide, 35 wt % to 60 wt % of a second carbide composed of carbides or carbonitrides of 4a, 5a and 6a iron group elements of the periodic table, and 10 wt % to 30 wt % of nickel or stainless alloy metal binder phase.

5. The ring according to claim 1, wherein the inside inner ring is composed of either of surgical stainless steel or gold, or a mixture of both the surgical stainless steel and gold at a predetermined amount.

* * * * *